US007378677B2

(12) United States Patent
Iwakiri

(10) Patent No.: US 7,378,677 B2
(45) Date of Patent: May 27, 2008

(54) ELECTROSTATIC LATENT IMAGE READ-OUT METHOD AND APPARATUS

(75) Inventor: Naoto Iwakiri, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 249 days.

(21) Appl. No.: 10/864,391

(22) Filed: Jun. 10, 2004

(65) Prior Publication Data

US 2004/0251438 A1 Dec. 16, 2004

(30) Foreign Application Priority Data

Jun. 12, 2003 (JP) ............................ 2003/167312

(51) Int. Cl.
*G02B 26/10* (2006.01)

(52) U.S. Cl. ...................................................... 250/591

(58) Field of Classification Search ................. 250/591
See application file for complete search history.

(56) References Cited

U.S. PATENT DOCUMENTS 4,176,275 A 11/1979 Korn et al.
5,128,893 A * 7/1992 Takanashi et al. .......... 365/112
5,440,146 A 8/1995 Steffen et al.
5,510,626 A 4/1996 Nelson et al.
6,268,614 B1 7/2001 Imai
6,376,857 B1 4/2002 Imai
2001/0025936 A1 10/2001 Shoji
2002/0000528 A1 1/2002 Imai
2002/0001366 A1 1/2002 Tamura et al.

FOREIGN PATENT DOCUMENTS

JP 2000-162726 A 6/2000
JP 2001-264496 A 9/2001
JP 2002-22843 A 1/2002

OTHER PUBLICATIONS

"A Method of Electronic Readout of Electrophotographic and Electroradiographic Image," Korn et al, Journal of Applied Photographic Engineering, vol. 4, No. 4, Fall 1978, pp. 178-182.

* cited by examiner

*Primary Examiner*—Christine Sung
(74) *Attorney, Agent, or Firm*—Sughrue Mion, PLLC

(57) ABSTRACT

An electrostatic recording material, on which image information has been recorded as an electrostatic latent image, and which is capable of outputting a signal in accordance with the electrostatic latent image by being subjected to exposure scanning with reading light having been produced by a reading light source, is obtained. Electrostatic shielding is performed between a moving member, which is capable of moving at the time of the exposure scanning of the electrostatic recording material with the reading light, and which has characteristics of undergoing capacity coupling with the electrostatic recording material, and the electrostatic recording material. The exposure scanning is performed in this state.

20 Claims, 3 Drawing Sheets

ELECTROSTATIC LATENT IMAGE READ-OUT METHOD AND APPARATUS

BACKGROUND OF THE INVENTION

1. Field of the Invention

This invention relates to an electrostatic latent image read-out method and apparatus. This invention particularly relates to an electrostatic latent image read-out method and apparatus, wherein reading light having been produced by a reading light source is irradiated to an electrostatic recording material, on which image information has been recorded as an electrostatic latent image, and which is capable of outputting a signal in accordance with the electrostatic latent image by being subjected to exposure scanning with the reading light, and the electrostatic latent image is thereby read out from the electrostatic recording material.

2. Description of the Related Art

Systems for recording and reading out radiation image information by the utilization of electrostatic recording materials have heretofore been proposed. With the proposed systems for recording and reading out radiation image information, such that a radiation dose delivered to an object during a medical X-ray image recording operation may be kept small, and such that the image quality of an image and its capability of serving as an effective tool in, particularly, the efficient and accurate diagnosis of an illness may be enhanced, a photo-conductive material sensitive to X-rays, such as a selenium plate constituted of, e.g., amorphous selenium (a-Se), is employed as an electrostatic recording material. The electrostatic recording material is exposed to radiation (i.e., recording light), such as X-rays, carrying radiation image information, and latent image charges carrying the radiation image information are thereby accumulated in the electrostatic recording material. Thereafter, the electrostatic recording material is scanned with reading light, such as a laser beam, and currents occurring in the electrostatic recording material are detected via flat plate-shaped electrodes or stripe-shaped electrodes, which are located on opposite surface sides of the electrostatic recording material. In this manner, the electrostatic latent image represented by the latent image charges, i.e. the radiation image information, is readout. (Such systems for recording and reading out radiation image information are described in, for example, Patent Literature 1, Patent Literature 2, Patent Literature 3, and Non-Patent Literature 1.)

Also, the applicant proposed an electrostatic recording material and a read-out apparatus for reading out radiation image information from the electrostatic recording material, on which the radiation image information has been recorded. The proposed electrostatic recording material comprises:

i) a first electrical conductor layer having transmissivity to recording radiation, ii) a recording photo-conductive layer, which exhibits photo-conductivity when it is exposed to the recording radiation, iii) a charge transporting layer, which acts approximately as an insulator with respect to electric charges having a polarity identical with the polarity of electric charges occurring in the first electrical conductor layer, and which acts approximately as a conductor with respect to electric charges having a polarity opposite to the polarity of the electric charges occurring in the first electrical conductor layer, iv) a reading photo-conductive layer, which exhibits photo-conductivity when it is exposed to reading light, and v) a second electrical conductor layer having transmissivity to the reading light, the layers being overlaid in this order. (The proposed electrostatic recording material and the proposed read-out apparatus are described in, for example, Patent Literature 4.)

With the read-out apparatus described in Patent Literature 4, the electrostatic recording material, on which an electrostatic latent image has been recorded, is scanned with the reading light having been produced by a light source, and the electrostatic latent image having been recorded on the electrostatic recording material is thereby read out. The exposure scanning with the reading light may be performed with a technique, wherein the electrostatic recording material is scanned with spot light, such as a laser beam, in a main scanning direction and a sub-scanning direction, a technique, wherein a line light source for producing linear reading light is moved in a sub-scanning direction, or the like.

The conventional read-out apparatus described above is often utilized for medical purposes. In such cases, it is necessary for the dose of X-rays, which are ordinarily employed as the recording light, to be kept small. Therefore, it is required that the read-out apparatus be a low-noise system. Also, in order for adverse effects of X-ray scattering to be suppressed, a grid is often utilized at the time of the image recording. In order for moire stripes to be prevented from occurring, a moving grid, which vibrates, is often utilized at the time of the image recording. (The technique for utilizing the moving grid is described in, for example, Patent Literature 6.)

Patent Literature 1:
U.S. Pat. No. 4,176,275
Patent Literature 2:
U.S. Pat. No. 5,440,146
Patent Literature 3:
U.S. Pat. No. 5,510,626
Patent Literature 4:
U.S. Pat. No. 6,268,614
Patent Literature 5:
U.S. Patent Laid-Open No. 20010025936
Patent Literature 6:
U.S. Patent Laid-Open No. 20020001366
Non-Patent Literature 1:
"A Method of Electronic Readout of Electrophotographic and Electroradiographic Image," Journal of Applied Photographic Engineering, Volume 4, Number 4, Fall 1978, pp. 178-182

However, in the cases of electrostatic latent image read-out apparatuses provided with a moving member, which moves or has possibility of moving while the exposure scanning with the reading light is being performed, and the signal is being readout, it often occurs that the moving member constitutes a noise source, and that a signal-to-noise ratio of the signal having been read out becomes low. Specifically, in cases where the moving member has the characteristics of undergoing capacity coupling with the electrostatic recording material, if the moving member moves at the time of the exposure scanning, the problems will occur in that the capacity of the electrostatic recording material fluctuates, and that the signal-to-noise ratio of the signal obtained from the exposure scanning becomes low.

In cases where the exposure scanning is performed through the movement of the reading light source, it often occurs that the reading light source itself acts as the moving member that constitutes the noise source. Also, a releasably secured member which is not secured firmly, or the like, has the possibility of moving at the time of the exposure scanning, and it may be considered that the releasably secured member, or the like, is one kind of the moving member that constitutes the noise source. In particular, in the cases of the read-out apparatuses, in which the reading light source moves during the exposure scanning, due to the moving operation of the reading light source, there is the possibility that, besides the reading light source itself, other moving members will move.

Also, in Patent Literature 6 described above, the moving grid is described as one of the moving members. Specifically, in cases where the outputting of the signal is performed in the state in which the vibrations of the moving grid have not yet been ceased perfectly, it often occurs that the fluctuation in capacity of the electrostatic recording material occurs, and that the signal-to-noise ratio of the obtained signal become low. Therefore, it may be considered that the moving grid also acts as the moving member that constitutes the noise source. In Patent Literature 6 described above, a technique for operating the moving member at uniform speed, or a technique for performing the outputting of the signal after the movement of the moving member has been ceased perfectly is utilized in order to prevent the capacity of the electrostatic recording material from fluctuating at the time of the outputting of the signal. However, with the technique utilized in Patent Literature 6 described above, the problems occur in that a throughput of the signal outputting operation cannot be kept high.

SUMMARY OF THE INVENTION

The primary object of the present invention is to provide an electrostatic latent image read-out method, wherein a signal-to-noise ratio of a signal outputted in accordance with an electrostatic latent image is capable of being enhanced, and wherein a throughput of a signal outputting operation is capable of being kept high.

Another object of the present invention is to provide an electrostatic latent image read-out apparatus for carrying out the electrostatic latent image read-out method.

The present invention provides an electrostatic latent image read-out method, comprising the steps of:

i) obtaining an electrostatic recording material, on which image information has been recorded as an electrostatic latent image, and which is capable of outputting a signal in accordance with the electrostatic latent image by being subjected to exposure scanning with reading light having been produced by a reading light source, ii) performing electrostatic shielding between a moving member, which is capable of moving at the time of the exposure scanning of the electrostatic recording material with the reading light, and which has characteristics of undergoing capacity coupling with the electrostatic recording material, and the electrostatic recording material with electrostatic shielding means, iii) performing the exposure scanning of the electrostatic recording material with the reading light in a state in which the electrostatic shielding is performed between the moving member and the electrostatic recording material, and iv) detecting the signal, which has been outputted from the electrostatic recording material and in accordance with the electrostatic latent image having been recorded on the electrostatic recording material.

The present invention also provides an electrostatic latent image read-out apparatus, comprising:

i) a reading light source for producing reading light, ii) an electrostatic recording material, on which image information has been recorded as an electrostatic latent image, and which is capable of outputting a signal in accordance with the electrostatic latent image by being subjected to exposure scanning with the reading light having been produced by the reading light source, and iii) a moving member, which is capable of moving at the time of the exposure scanning of the electrostatic recording material with the reading light, and which has characteristics of undergoing capacity coupling with the electrostatic recording material, wherein the apparatus further comprises electrostatic shielding means for performing electrostatic shielding between the moving member and the electrostatic recording material.

The term "moving member" as used herein means a member, which is capable of moving at the time of the exposure scanning of the electrostatic recording material with the reading light. Examples of the moving members include a member, which is intended to be moved at the time of the exposure scanning of the electrostatic recording material with the reading light, a member, which has moved immediately before the exposure scanning is started and which therefore has the possibility of moving at the time of the exposure scanning, and a releasably secured member, which is capable of moving due to vibrations, or the like, at the time of the exposure scanning of the electrostatic recording material with the reading light. The releasably secured member is the member, which is secured comparatively loosely at the time of a fitting operation due to the capability of being secured releasably and is capable of undergoing a movement at the time of the exposure scanning of the electrostatic recording material with the reading light. Examples of the releasably secured members include a member, which is capable of being easily secured releasably without a tool, such as a screw driver, being used, a member, which is secured at a predetermined position by use of a stopper, or the like, a member, which is secured with a screw that is capable of being fastened and unfastened with the force of fingers, a member, which is secured by being pushed by an elastic member, and a member, which is secured by being fitted into a groove having been formed on a support base, or the like.

Specifically, examples of the members, which are intended to be moved at the time of the exposure scanning of the electrostatic recording material with the reading light, include the reading light source, an erasing light source, vertical movement means for vertically moving the electrostatic recording material to a predetermined position for the recording of next image information, and movement means for moving the electrostatic recording material to a predetermined position for the recording of the next image information. Examples of the members, which have moved immediately before the exposure scanning is started and which therefore have the possibility of moving at the time of the exposure scanning, include a moving grid, and movement means for moving the electrostatic recording material to a position for readout. An example of the releasably secured member is a cassette for supporting a grid and the electrostatic recording material.

The electrostatic shielding means may be electric potential equalizing means for setting an electric potential of the moving member and the electric potential of the electrostatic recording material at an identical level. Alternatively, the electrostatic shielding means may be grounding means for grounding the moving member and the electrostatic recording material. As another alternative, the electrostatic shielding means may be an electrostatic shielding box, in which either one of the moving member and the electrostatic recording material is accommodated, the electrostatic shielding box being formed with an electrically conductive material, part of the electrostatic shielding box being connected to a predetermined electric potential source.

The reading light is not limited to light, such as infrared light, visible light, and ultraviolet light, and maybe one of electromagnetic waves, which have various wavelengths and are capable of being utilized for reading out the electrostatic latent image having been recorded on the electrostatic recording material.

With the electrostatic latent image read-out method and apparatus in accordance with the present invention, the electrostatic shielding between the moving member and the electrostatic recording material is performed with the electrostatic shielding means. Therefore, the moving member does not undergo capacity coupling with the electrostatic recording material. Accordingly, in cases where the moving member moves, fluctuations in capacity of the electrostatic recording material are not caused to occur, and the signal-to-noise ratio of the obtained signal is capable of being enhanced. Also, a particular operation for operating the moving member at uniform speed, or a particular operation for performing the outputting of the signal after the movement of the moving member has been ceased perfectly need not be performed. Therefore, the throughput of a signal outputting operation is capable of being kept high.

Further, with the electrostatic latent image read-out method and apparatus in accordance with the present invention, in cases where the moving member is the reading light source, the movement speed of the reading light source is capable of being set at an arbitrary speed. Therefore, the throughput of the signal outputting operation is capable of being enhanced.

With the electrostatic latent image read-out method and apparatus in accordance with the present invention, wherein the electrostatic shielding means is the electric potential equalizing means for setting the electric potential of the moving member and the electric potential of the electrostatic recording material at an identical level, the provision of the electrostatic shielding means is capable of being performed easily. With the electrostatic latent image read-out method and apparatus in accordance with the present invention, wherein the electrostatic shielding means is the grounding means for grounding the moving member and the electrostatic recording material, the electrostatic shielding is capable of being performed reliably. With the electrostatic latent image read-out method and apparatus in accordance with the present invention, the electrostatic shielding means may be the electrostatic shielding box, in which either one of the moving member and the electrostatic recording material is accommodated, the electrostatic shielding box being formed with the electrically conductive material, part of the electrostatic shielding box being connected to the predetermined electric potential source. In such cases, the moving member or the electrostatic recording material, which is accommodated within the electrostatic shielding box, does not undergo the capacity coupling with other members, such as signal read-out lines. Therefore, the signal-to-noise ratio of the read-out signal is capable of being enhanced even further.

DESCRIPTION OF THE PREFERRED EMBODIMENTS

The present invention will hereinbelow be described in further detail with reference to the accompanying drawings.

Figure 1A:
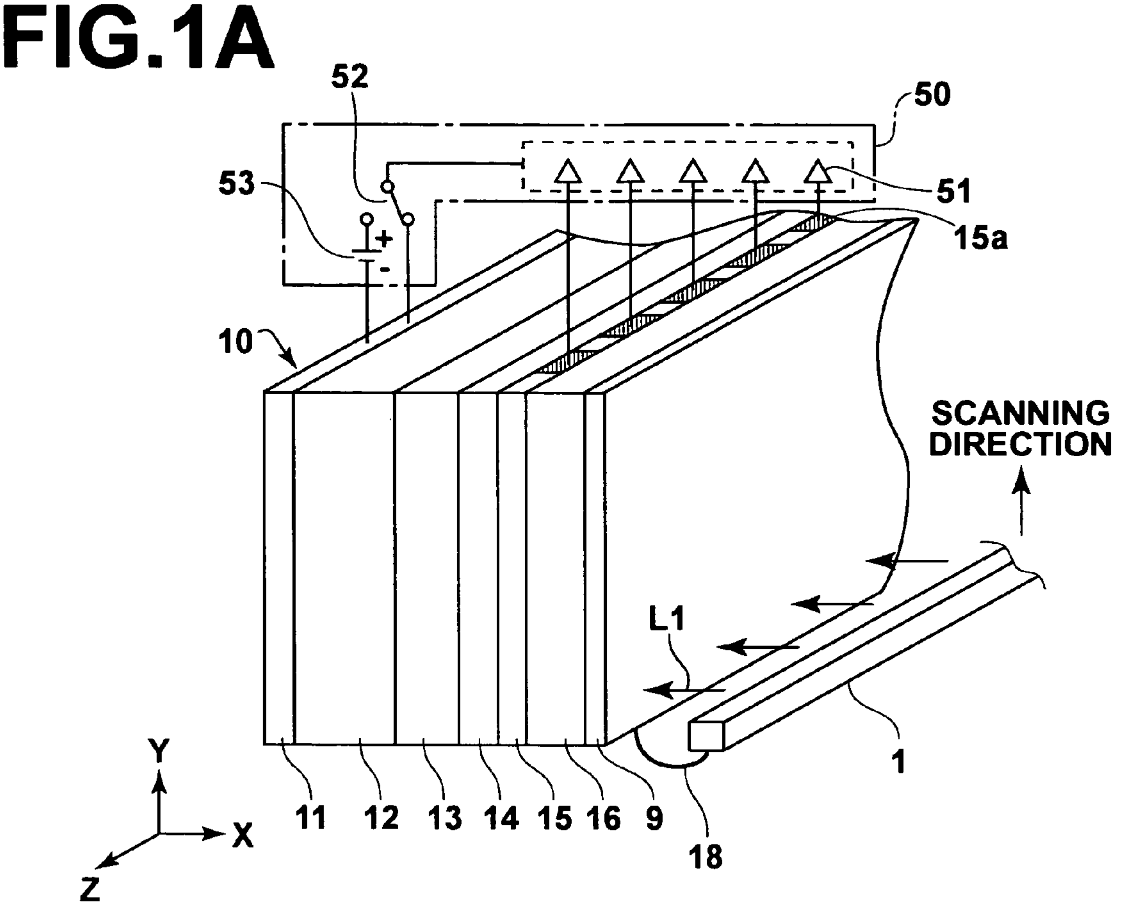
FIG. 1A is a perspective view showing a first embodiment of the electrostatic latent image read-out apparatus in accordance with the present invention.
Figure 1B:
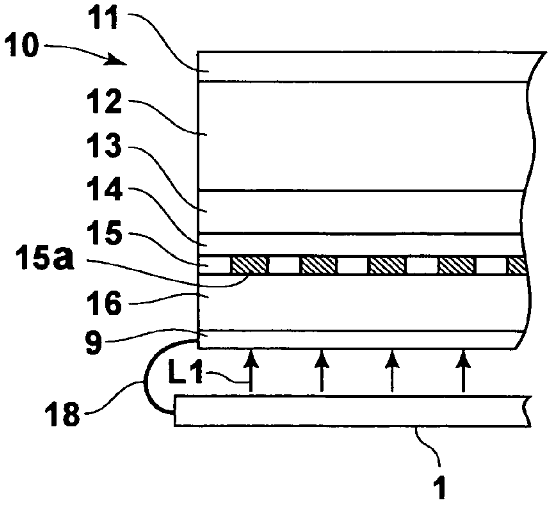
FIG. 1B is an X-Z cross-sectional view of FIG. 1A.

FIG. 1A is a perspective view showing a first embodiment of the electrostatic latent image read-out apparatus in accordance with the present invention. FIG. 1B is an X-Z cross-sectional view of FIG. 1A. As illustrated in FIG. 1A, the electrostatic latent image read-out apparatus comprises an electrostatic recording material 10. The electrostatic latent image read-out apparatus also comprises a reading light source 1 for irradiating reading light L1 to the electrostatic recording material 10 at the time of readout of image information from the electrostatic recording material 10. The electrostatic latent image read-out apparatus further comprises an indium tin oxide (ITO) film 9, which is formed over the entire area of the surface of the electrostatic recording material 10, which surface stands facing the reading light source 1. The electrostatic latent image read-out apparatus still further comprises current detecting means 50 for detecting electric currents, which flow out from the electrostatic recording material 10 when the electrostatic recording material 10 is scanned with the reading light L1. The electrostatic latent image read-out apparatus also comprises a wire 18 for electrically connecting the ITO film 9 and the reading light source 1 to each other. The ITO film 9 is an electrically conductive film, which is transparent with respect to the reading light L1.

The electrostatic recording material 10 records radiation image information as an electrostatic latent image. The electrostatic recording material 10 outputs electric currents in accordance with the electrostatic latent image when the electrostatic recording material 10 is scanned with the reading light L1. Specifically, the electrostatic recording material 10 comprises a first electrical conductor layer 11, which has transmissivity to recording radiation (e.g., X-rays). (The recording radiation will herein below be referred to as the recording light L2.) The electrostatic recording material 10 also comprises a recording photo-conductive layer 12, which exhibits photo-conductivity when it is exposed to the recording light L2. The electrostatic recording material 10 further comprises a charge transporting layer 13, which acts approximately as an insulator with respect to electric charges (latent image polarity charges, e.g. negative charges) having a polarity identical with the polarity of electric charges occurring in the first electrical conductor layer 11, and which acts approximately as a conductor with respect to electric charges (transported polarity charges, positive charges in this example) having a polarity opposite to the polarity of the electric charges occurring in the first electrical conductor layer 11. The electrostatic recording material 10 still further comprises a reading photo-conductive layer 14, which exhibits photo-conductivity when it is exposed to the reading light L1, and a second electrical conductor layer 15 having transmissivity to the reading light L1. The first electrical conductor layer 11, the recording photo-conductive layer 12, the charge transporting layer 13, the reading photo-conductive layer 14, and the second electrical conductor layer 15 are overlaid on a glass substrate 16. The second electrical conductor layer 15 is formed as a striped electrode comprising a plurality of elements (linear electrodes) 15*a*, 15*a*, . . . , which are hatched in FIG. 1A. The elements 15*a*, 15*a*, . . . are located at pixel pitches and in a striped pattern.

The current detecting means 50 has a plurality of current detection amplifiers 51, 51, . . . , each of which is connected to one of the elements 15*a*, 15*a*, . . . of the second electrical conductor layer 15. The current detecting means 50 detects electric currents, which flow through the elements 15*a*, 15*a*, . . . due to exposure to the reading light L1, in a parallel manner. The first electrical conductor layer 11 of the electrostatic recording material 10 is connected to one of input terminals of connection means 52 and to a negative pole of an electric power source 53. A positive pole of the electric power source 53 is connected to the other input terminal of the connection means 52. Though not shown in FIG. 1A, an output terminal of the connection means 52 is connected to each of the current detection amplifiers 51, 51, . . . . The current detection amplifiers 51, 51, . . . may have one of various known constitutions. The manner in which the connection means 52 and the electric power source 53 are connected may vary for different constitutions of the current detection amplifiers 51, 51, . . . .

The reading light source 1 is a line light source, which comprises a plurality of light emitting devices arrayed in a line. The reading light source 1 is moved in the scanning direction indicated in FIG. 1A in order to perform exposure scanning. The reading light source 1 acts as the moving member of the electrostatic latent image read-out apparatus in accordance with the present invention.

How the first embodiment of the electrostatic latent image read-out apparatus in accordance with the present invention operates will be described hereinbelow.

When the electrostatic latent image is to be recorded on the electrostatic recording material 10, firstly, the connection of the connection means 52 is changed over to the side of the electric power source 53, and a d.c. voltage is applied across the first electrical conductor layer 11 and the elements 15*a*, 15*a*, . . . of the second electrical conductor layer 15. In this manner, the first electrical conductor layer 11 and the second electrical conductor layer 15 are electrically charged. As a result, a U-shaped electric field having the concavity of the U-shape at the element 15*a* is formed between the first electrical conductor layer 11 and the element 15*a* in the electrostatic recording material 10.

Thereafter, the recording light L2 is irradiated to an object (not shown), and the recording light L2 having passed through the object, i.e. radiation carrying radiation image information of the object, is irradiated to the electrostatic recording material 10. As a result, pairs of positive and negative charges occur in the recording photo-conductive layer 12 of the electrostatic recording material 10. Of the pairs of positive and negative charges, the negative charges are centralized upon the elements 15*a*, 15*a*, . . . along the electric field distribution described above. In this manner, the negative charges are accumulated at the interface between the recording photo-conductive layer 12 and the charge transporting layer 13. The amount of the accumulated negative charges (the latent image charges) is approximately in proportion to the dose of radiation delivered to the electrostatic recording material 10. Therefore, the latent image charges carry the electrostatic latent image. In this manner, the electrostatic latent image is recorded on the electrostatic recording material 10. The positive charges occurring in the recording photo-conductive layer 12 are attracted to the first electrical conductor layer 11, combine with negative charges injected from the electric power source 53, and disappear.

When the electrostatic latent image is to be read out from the electrostatic recording material 10, firstly, the connection of the connection means 52 is changed over to the side of the first electrical conductor layer 11 of the electrostatic recording material 10.

The line-like reading light L1, which has been produced by the reading light source 1, passes through the glass substrate 16 and the elements 15*a*, 15*a*, . . . of the second electrical conductor layer 15 of the electrostatic recording material 10. As a result, pairs of positive and negative charges occur in the reading photo-conductive layer 14. Of the pairs of positive and negative charges, the positive charges move quickly through the charge transporting layer 13 so as to be attracted by the negative charges (the latent image charges), which have been accumulated at the interface between the recording photo-conductive layer 12 and the charge transporting layer 13. The positive charges combine with the latent image charges at the interface between the recording photo-conductive layer 12 and the charge transporting layer 13 and disappear. The negative charges occurring in the reading photo-conductive layer 14 combine with positive charges, which are injected from the electric power source 53 into the second electrical conductor layer 15, and disappear. In this manner, the negative charges having been accumulated in the electrostatic recording material 10 disappear through charge re-combination, and electric currents due to the movement of the electric charges at the time of the charge re-combination occur in the electrostatic recording material 10. The electric currents are detected for the respective elements 15*a*, 15*a*, . . . in a parallel manner by the current detection amplifiers 51, 51, . . . , each of which is connected to one of the elements 15*a*, 15*a*, . . . The electric currents flowing through the electrostatic recording material 10 at the time of the readout occur in accordance with the latent image charges, i.e. the electrostatic latent image. Therefore, the electrostatic latent image is capable of being read out through the detection of the electric currents. The reading light source 1 performs the exposure scanning in the scanning direction indicated by the arrow in FIG. 1A, and the entire area of the electrostatic recording material 10 is thus exposed to the reading light L1.

In this embodiment, the reading light source 1 is electrically connected by the wire 18 to the ITO film 9, which is the electrically conductive film and is formed over the entire area of the surface of the electrostatic recording material 10. Therefore, the electric potential of the reading light source 1 and the electric potential of the electrostatic recording material 10 are set at the identical level. Accordingly, the reading light source 1 does not undergo the capacity coupling with the electrostatic recording material 10. As a result, fluctuations in capacity of the electrostatic recording material 10 are not caused to occur when the reading light source 1 moves, and the signal-to-noise ratio of the obtained signal is capable of being enhanced.

Also, since the reading light source 1 does not undergo the capacity coupling with the electrostatic recording material 10, the movement speed of the reading light source 1 is capable of being set at an arbitrary speed, and the throughput of the signal outputting operation is capable of being enhanced. Further, since the electric potential equalizing means with the wire 18 is utilized as the electrostatic shielding means, the electrostatic shielding is capable of being performed with the simple structure and easily.

Figure 2:
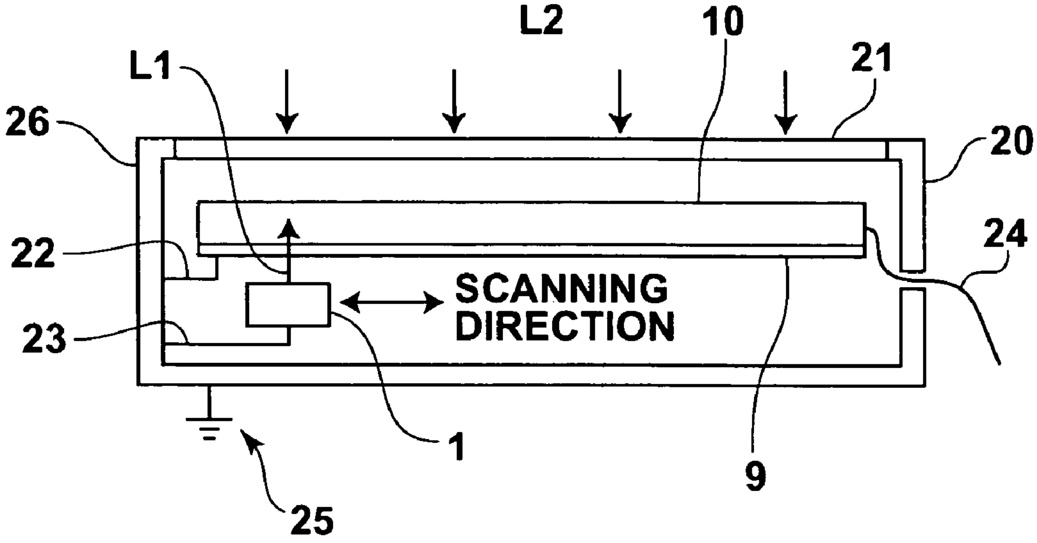
FIG. 2 is a cross-sectional view showing a second embodiment of the electrostatic latent image read-out apparatus in accordance with the present invention.

A second embodiment of the electrostatic latent image read-out apparatus in accordance with the present invention will be described hereinbelow with reference to FIG. 2. FIG. 2 is a cross-sectional view showing a second embodiment of the electrostatic latent image read-out apparatus in accordance with the present invention. In FIG. 2, similar elements are numbered with the same reference numerals with respect to FIG. 1A.

In the second embodiment of the electrostatic latent image read-out apparatus in accordance with the present invention, the reading light source 1 and the electrostatic recording material 10, which are illustrated in FIG. 1A, are located within a casing 20. Also, the casing 20 is grounded. Further, the ITO film 9 of the electrostatic recording material 10 is electrically connected by a wire 22 to the casing 20, and the reading light source 1 is electrically connected by a wire 23 to the casing 20. In this manner, the electrostatic recording material 10, which is provided with the ITO film 9, and the reading light source 1 are grounded. The electrostatic recording material 10 is connected by a flexible print circuit (FPC) 24 to a current detecting section (not shown).

The casing 20 has an electrostatic shielding box structure formed from an electrical conductor material and is grounded by a grounding conductor 25. A wall 21 of the casing 20, which wall stands facing the incidence side of the recording light L2, is made from an electric conductor material having transmissivity to the recording light L2. In cases where the X-rays are utilized as the recording light L2, a carbon plate, an aluminum-evaporated film, or the like, may be used as the material for the wall 21. A wall 26 of the casing 20 other than the wall 21 is made from an ordinary electrically conductive material.

In cases where the electrostatic latent image having been recorded on the electrostatic recording material 10 is to be read out from the electrostatic recording material 10, the reading light source 1 performs the exposure scanning in the directions indicated by the double headed arrow in FIG. 2. The entire area of the surface of the electrostatic recording material 10 is thus exposed to the reading light L1. Also, the image information is transmitted through the FPC 24 to the current detecting section. The wire 22, the wire 23, the casing 20, and the grounding conductor 25 together act as the grounding means of the electrostatic latent image read-out apparatus in accordance with the present invention.

In the second embodiment, the reading light source 1 is grounded by the wire 23, the casing 20, and the grounding conductor 25. Also, the electrostatic recording material 10 is grounded by the wire 22, the casing 20, and the grounding conductor 25. Therefore, the electric potential of the reading light source 1 and the electric potential of the electrostatic recording material 10 are set at the identical level. Accordingly, the reading light source 1 does not undergo the capacity coupling with the electrostatic recording material 10. As a result, as in the first embodiment described above, the throughput of the signal outputting operation is capable of being kept high, and the signal-to-noise ratio of the obtained signal is capable of being enhanced.

Also, since the grounding means, which is constituted of the wire 22, the wire 23, the casing 20, and the grounding conductor 25, is employed as the electrostatic shielding means, the electrostatic shielding is capable of being performed reliably. Further, since the casing 20 has the electrostatic shielding box structure, the problems are capable of being prevented from occurring in that the reading light source 1 undergoes the capacity coupling with the FPC 24 and the current detecting section, which are located on the side outward from the casing 20. Therefore, the signal-to-noise ratio of the obtained signal is capable of being enhanced even further.

Figure 3:
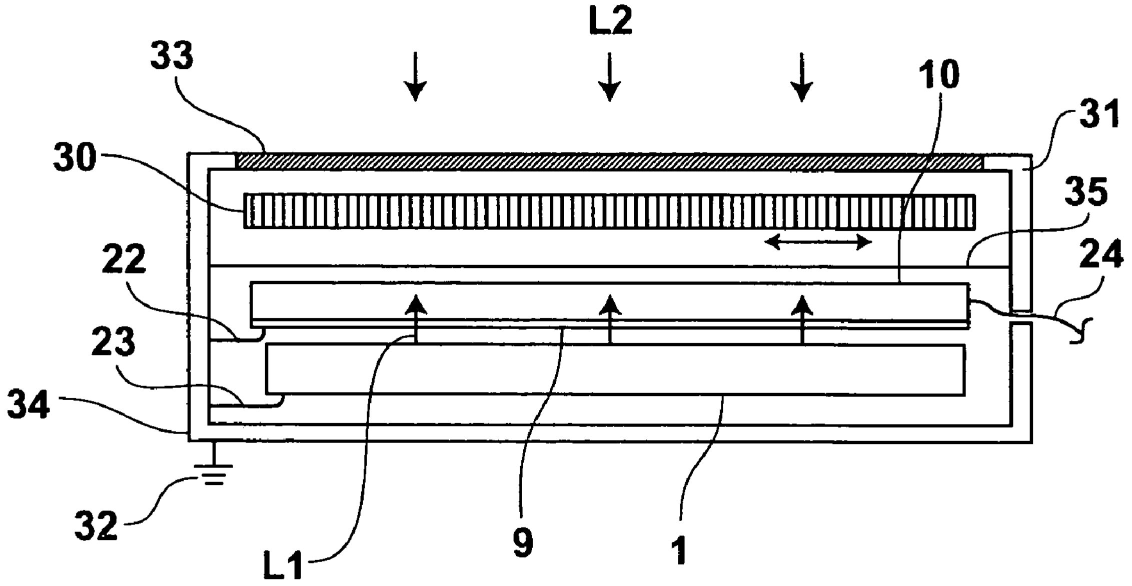
FIG. 3 is a cross-sectional view showing a third embodiment of the electrostatic latent image read-out apparatus in accordance with the present invention.

A third embodiment of the electrostatic latent image read-out apparatus in accordance with the present invention will be described hereinbelow with reference to FIG. 3. FIG. 3 is a cross-sectional view showing a third embodiment of the electrostatic latent image read-out apparatus in accordance with the present invention. In FIG. 3, similar elements are numbered with the same reference numerals with respect to FIG. 2.

In the third embodiment of the electrostatic latent image read-out apparatus in accordance with the present invention, the reading light source 1, the electrostatic recording material 10, and a moving grid 30 acting as the moving member are located within a casing 31. The reading light source 1 and the electrostatic recording material 10 are grounded. Also, the moving grid 30 is accommodated within an electrostatic shielding box.

The moving grid 30 is provided with recording light low-absorption members and recording light high-absorption members, which extend in the direction normal to the plane of the sheet of FIG. 3 and are located in a striped pattern. At the time of the irradiation of the recording light L2 to the electrostatic recording material 10, the moving grid 30 is vibrated in the directions indicted by the double headed arrow in FIG. 3.

The casing 31 has an electrostatic shielding box structure formed from an electrical conductor material and is grounded by a grounding conductor 32. A wall 33 of the casing 31, which wall stands facing the incidence side of the recording light L2, is made from an electric conductor material having transmissivity to the recording light L2. In cases where the X-rays are utilized as the recording light L2, a carbon plate, an aluminum-evaporated film, or the like, may be used as the material for the wall 33. A wall 34 of the casing 31 other than the wall 33 is made from an ordinary electrically conductive material. Also, the space, in which the reading light source 1 and the electrostatic recording material 10 are accommodated, and the space, in which the moving grid 30 is accommodated, are electrically isolated from each other by a ray conductive thin film 35, which transmits the recording light L2. Therefore, the casing, which is constituted of the wall 33, part of the wall 34, and the ray conductive thin film 35, and in which the moving grid 30 is accommodated, and the casing, which is constituted of the remaining part of the wall 34 and the ray conductive thin film 35, and in which the reading light source 1 and the electrostatic recording material 10 are accommodated, have the independent electrostatic shielding box structures.

In cases where the electrostatic latent image having been recorded on the electrostatic recording material 10 is to be read out from the electrostatic recording material 10, the reading light source 1 performs the exposure scanning in the direction normal to the plane of the sheet of FIG. 3. The entire area of the surface of the electrostatic recording material 10 is thus exposed to the reading light L1. Also, the image information is transmitted through the FPC 24 to the current detecting section. The wire 22, the wire 23, the casing 31, and the grounding conductor 32 together act as the grounding means of the electrostatic latent image read-out apparatus in accordance with the present invention.

In the third embodiment, the reading light source 1 is grounded by the wire 23, the casing 31, and the grounding conductor 32. Also, the electrostatic recording material 10 is grounded by the wire 22, the casing 31, and the grounding conductor 32. Therefore, the electric potential of the reading light source 1 and the electric potential of the electrostatic recording material 10 are set at the identical level. Accordingly, the reading light source 1 does not undergo the capacity coupling with the electrostatic recording material 10. As a result, as in the second embodiment described above, the throughput of the outputting of the signal in accordance with the electrostatic latent image is capable of being kept high, and the signal-to-noise ratio of the obtained signal is capable of being enhanced reliably.

Also, in the third embodiment, the moving grid 30 is accommodated within the electrostatic shielding box structure, which is constituted of the wall 33, part of the wall 34, and the ray conductive thin film 35. Therefore, the moving grid 30 does not undergo the capacity coupling with the electrostatic recording material 10. Accordingly, in cases where the exposure scanning of the electrostatic recording material 10 with the reading light L1 is performed, and the outputting of the signal is performed in the state in which the vibrations of the moving grid 30 have not yet been ceased perfectly, the fluctuation in capacity of the electrostatic recording material 10 does not occur, and the signal-to-noise ratio of the obtained signal is capable of being enhanced.

Figure 4A:
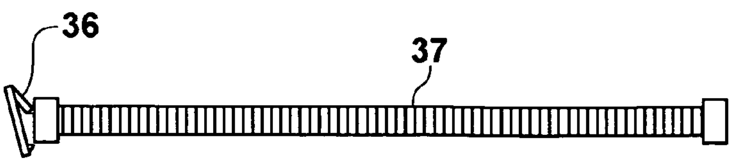
FIG. 4A is a schematic view showing a different type of a grid.
Figure 4B:
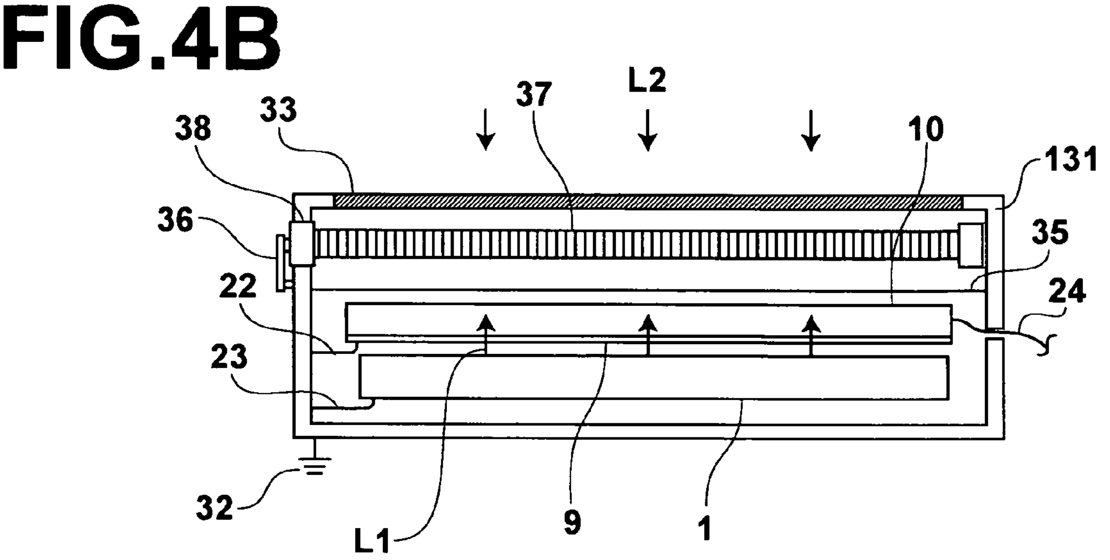
FIG. 4B is a cross-sectional view showing a modification of the third embodiment of the electrostatic latent image read-out apparatus in accordance with the present invention, wherein the grid of FIG. 4A is employed.

As illustrated in, for example, FIG. 4A, in a modification of the third embodiment, a releasable type of grid may be employed in lieu of the moving grid 30. In the modification of the third embodiment, a grid 37 provided with a clip 36 as illustrated in FIG. 4A is inserted into a casing 131 provided with an aperture 38 as illustrated in FIG. 4B and is secured to the casing 131 by use of the clip 36. Also, the clip 36 is made from an electrically conductive member, and the casing in which the grid 37 is accommodated is thereby constituted as the electrostatic shielding box structure. Since the releasable type of the grid 37 is not secured firmly to the casing 131, the grid 37 has the possibility of moving at the time of the exposure scanning of the electrostatic recording material 10 with the reading light L1. In particular, the grid 37 is apt to move in cases where the grid 37 undergoes vibrations due to the movement operation of the reading light source 1, a movement operation of the electrostatic latent image read-out apparatus performed in order to adjust the position, the height, or the like, of an image recording section with respect to an object whose image is to be recorded in cases where the electrostatic latent image read-out apparatus is constituted as a built-in type of apparatus, or the like. However, in the modification of the third embodiment, wherein the grid 37 is accommodated within the electrostatic shielding box structure, the grid 37 does not undergo the capacity coupling with the electrostatic recording material 10. Therefore, in cases where the grid 37 moves at the time of the exposure scanning of the electrostatic recording material 10 with the reading light L1, the capacity of the electrostatic recording material 10 does not fluctuate.

Figure 5:
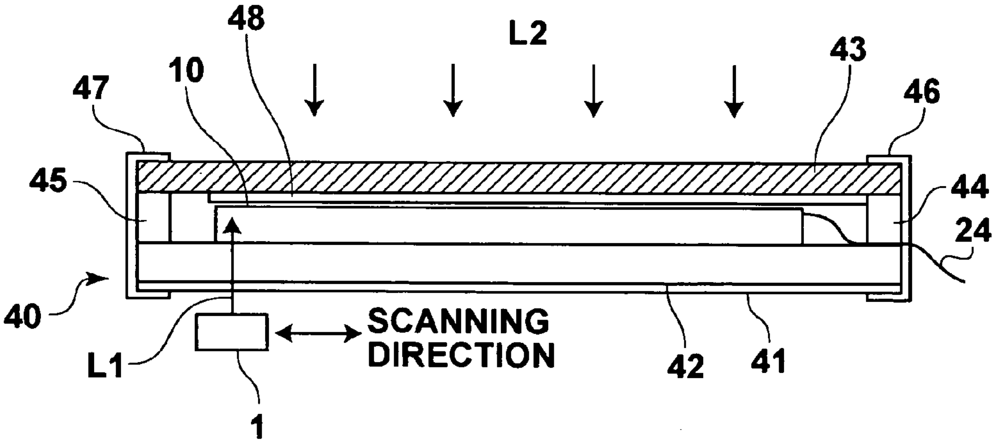
FIG. 5 is a cross-sectional view showing a fourth embodiment of the electrostatic latent image read-out apparatus in accordance with the present invention.

A fourth embodiment of the electrostatic latent image read-out apparatus in accordance with the present invention will be described hereinbelow with reference to FIG. 5. FIG. 5 is a cross-sectional view showing a fourth embodiment of the electrostatic latent image read-out apparatus in accordance with the present invention. In FIG. 5, similar elements are numbered with the same reference numerals with respect to FIG. 2.

In the fourth embodiment of the electrostatic latent image read-out apparatus in accordance with the present invention, the electrostatic recording material 10 is accommodated within a casing 40, which constitutes an electrostatic shielding box.

The casing 40 comprises a transparent base plate 42 provided with a transparent electrically conductive film 41. The transparent electrically conductive film 41 is formed on the bottom surface of the transparent base plate 42. The casing 40 also comprises a carbon plate 43. The casing 40 further comprises spacers 44 and 45, which are located between peripheral areas of the transparent base plate 42 and peripheral areas of the carbon plate 43. The casing 40 still further comprises electrically conductive sheets 46 and 47, which electrically connect the carbon plate 43 and the transparent electrically conductive film 41 to each other. The electrostatic recording material 10 is located on the transparent base plate 42. Also, an electrical insulation layer 48 is located above the electrostatic recording material 10. The electrical insulation layer 48 electrically insulates the carbon plate 43 from the first electrical conductor layer 11 (shown in FIG. 1A), which is formed at the top of the electrostatic recording material 10 in FIG. 5 and to which a high voltage is applied at the time of the image read-out operation. The electrostatic recording material 10 is connected by the FPC 24 to the current detecting section (not shown).

In cases where the electrostatic latent image having been recorded on the electrostatic recording material 10 is to be read out from the electrostatic recording material 10, the reading light source 1 performs the exposure scanning in the directions indicated by the double headed arrow in FIG. 5. The entire area of the surface of the electrostatic recording material 10 is thus exposed to the reading light L1. Also, the image information is transmitted through the FPC 24 to the current detecting section.

In the fourth embodiment, wherein the electrostatic recording material 10 is accommodated within the casing 40 having the electrostatic shielding box structure, the reading light source 1 does not undergo the capacity coupling with the electrostatic recording material 10. Therefore, in cases where the reading light source 1 is moved at the time of the image information readout, the problems do not occur in that a floating capacity due to the reading light source 1 undergoes the capacity coupling with the capacity of the electrostatic recording material 10, and that the capacity of the electrostatic recording material 10 thus fluctuates. Accordingly, the signal-to-noise ratio of the obtained signal is capable of being enhanced.

Also, with the fourth embodiment, wherein the electrostatic recording material 10 is accommodated with in the electrostatic shielding box, the electrostatic recording material 10 does not undergo the capacity coupling with members, which are located on the side outward from the electrostatic shielding box. Therefore, the signal-to-noise ratio of the obtained signal is capable of being enhanced even further.

In each of the first, second, third, and fourth embodiments described above, the electrostatic latent image read-out apparatus is provided with the reading light source and/or the grid, which acts as the moving member. However, the moving member is not limited to the reading light source and the grid. Examples of other moving members include an erasing light source for producing erasing light, a pre-exposure light source for producing pre-exposure light, movement means for moving the electrostatic recording material 10 to a predetermined position for the recording of next image information, movement means for moving the electrostatic recording material 10 to a position for readout, and a cassette for supporting the electrostatic recording material 10.

What is claimed is:

1. An electrostatic latent image read-out method, comprising the steps of:

i) obtaining an electrostatic recording material, on which image information has been recorded as an electrostatic latent image, and which is capable of outputting a signal in accordance with the electrostatic latent image by being subjected to exposure scanning with reading light having been produced by a reading light source, ii) performing electrostatic shielding between a moving member, which is capable of moving at the time of the exposure scanning of the electrostatic recording material with the reading light, and which has characteristics of undergoing capacity coupling with the electrostatic recording material, and the electrostatic recording material with electrostatic shielding means, iii) performing the exposure scanning of the electrostatic recording material with the reading light in a state in which the electrostatic shielding is performed between the moving member and the electrostatic recording material, and iv) detecting the signal, which has been outputted from the electrostatic recording material and in accordance with the electrostatic latent image having been recorded on the electrostatic recording material, wherein the electrostatic shielding means comprises an electrostatic shielding box, in which either one of the moving member and the electrostatic recording material is accommodated, the electrostatic shielding box being formed with an electrically conductive material, part of the electrostatic shielding box being connected to a predetermined electric potential source.

2. The method as defined in claim 1 wherein the moving member comprises the reading light source.

3. The method as defined in claim 2 wherein the electrostatic shielding means comprises electric potential equalizing means for setting an electric potential of the moving member and an electric potential of the electrostatic recording material at an identical level.

4. The method as defined in claim 3 wherein the electrostatic shielding means comprises grounding means for grounding the moving member and the electrostatic recording material.

5. The method as defined in claim 2 wherein the electrostatic shielding means comprises an electrostatic shielding box, in which either one of the moving member and the electrostatic recording material is accommodated, the electrostatic shielding box being formed with an electrlcally conductive material, part of the electrostatic shielding box being connected to a predetermined electric potential source.

6. The method as defined in claim 1 wherein the electrostatic shielding means comprises electric potential equalizing means for setting an electric potential of the moving member and an electric potential of the electrostatic recording material at an identical level.

7. The method as defined in claim 6 wherein the electrostatic shielding means comprises grounding means for grounding the moving member and the electrostatic recording material.

8. The method as defined in claim 1, wherein the electra static recording material further comprises an electrical conductor layer comprising a plurality of linear electrodes, wherein the signal is output from the electrical conductor layer.

9. The method as defined in claim 8, wherein the electrostatic recording material further comprises a photoconductive layer disposed adjacent to the electrical conductor layer.

10. An electrostatic latent image read-out apparatus, comprising:

i) a reading light source for producing reading light, ii) an electrostatic recording material, on which image information has been recorded as an electrostatic latent image, and which is capable of outputting a signal in accordance with the electrostatic latent image by being subjected to exposure scanning with the reading light having been produced by the reading light source, and iii) a moving member, which is capable of moving at the time of the exposure scanning of the electrostatic recording material with the reading light, and which has characteristics of undergoing capacity coupling with the electrostatic recording material, wherein the apparatus further comprises electrostatic shielding means for performing electrostatic shielding between the moving member and the electrostatic recording material, wherein the electrostatic shielding means comprises an electrostatic shielding box, in which either one of the moving member and the electrostatic recording material is accommodated, the electrostatic shielding box being formed with an electrically conductive material, part of the electrostatic shielding box being connected to a predetermined electric potential source.

11. The apparatus as defined in claim 10 wherein the moving member comprises the reading light source.

12. The apparatus as defined in claim 11 wherein the electrostatic shielding means comprises electric potential equalizing means for setting an electric potential of the moving member and an electric potential of the electrostatic recording material at an identical level.

13. The apparatus as defined in claim 12 wherein the electrostatic shielding means comprises rounding means for grounding the moving member and the electrostatic recording material.

14. The apparatus as defined in claim 11 wherein the electrostatic shielding means comprises an electrostatic shielding box, in which either one of the moving member and the electrostatic recording material is accommodated, the electrostatic shielding box being formed with an electrically conductive material, part of the electrostatic shielding box being connected to a predetermined electric potential source.

15. The apparatus as defined in claim 10 wherein the electrostatic shielding means comprises electric potential equalizing means for setting an electric potential of the moving member and an electric potential of the electrostatic recording material at an identical level.

16. The apparatus as defined in claim 15 wherein the electrostatic shielding means comprises grounding means for grounding the moving member and the electrostatic recording material.

17. The apparatus as defined in claim 10, wherein the signal comprises electrical currents corresponding to the latent electrostatic image.

18. The apparatus as defined in claim 17, further comprising a current detecting unit which detects said electrical currents if the image information is read from the electrostatic recording material.

19. The apparatus as defined in claim 10, wherein the electrostatic recording material further comprises an electrical conductor layer comprising a plurality of linear electrodes, wherein the signal is output from the electrical conductor layer.

20. The apparatus as defined in claim 19, wherein the electrostatic recording material further comprises a photoconductive layer disposed adjacent to the electrical conductor layer.

* * * * *